US011385119B2

(12) United States Patent
Stopel et al.

(10) Patent No.: US 11,385,119 B2
(45) Date of Patent: Jul. 12, 2022

(54) SENSOR APPARATUS HAVING A CRIMPED HOUSING AND A METHOD OF ASSEMBLING THE SAME

(71) Applicant: SENSATA TECHNOLOGIES, INC., Attleboro, MA (US)

(72) Inventors: Martijn H. W. Stopel, Hengelo (NL); Wenlong Xu, Jiangsu (CN); Werner J. P. Kleissen, Hengelo (NL)

(73) Assignee: Sensata Technologies, Inc., Attleboro, MA (US)

( * ) Notice: Subject to any disclaimer, the term of this patent is extended or adjusted under 35 U.S.C. 154(b) by 256 days.

(21) Appl. No.: 16/683,370

(22) Filed: Nov. 14, 2019

(65) Prior Publication Data
US 2021/0148778 A1 May 20, 2021

(51) Int. Cl.
| | |
|---|---|
| *G01L 19/14* | (2006.01) |
| *G01K 1/08* | (2021.01) |
| *G01L 19/00* | (2006.01) |
| *H01R 13/502* | (2006.01) |
| *H01R 43/18* | (2006.01) |

(Continued)

(52) U.S. Cl.
CPC .............. *G01L 19/142* (2013.01); *G01K 1/08* (2013.01); *G01L 19/0061* (2013.01);
(Continued)

(58) Field of Classification Search
CPC .............. G01L 19/148; G01L 19/0084; G01L 19/0007; G01L 19/147; G01L 19/144;
(Continued)

(56) References Cited

U.S. PATENT DOCUMENTS

| | | | | | |
|---|---|---|---|---|---|
| 5,150,275 A | * | 9/1992 | Lee | .................... | G01L 9/0072 |
| | | | | | 361/283.4 |
| 5,661,244 A | * | 8/1997 | Nishimura | .......... | G01L 19/0038 |
| | | | | | 73/706 |

(Continued)

FOREIGN PATENT DOCUMENTS

EP 2395336 A1 12/2011

OTHER PUBLICATIONS

International Search Report & Written Opinion for PCT/US2020/058360, dated Jan. 29, 2021, 10 pages.

*Primary Examiner* — Jonathan M Dunlap
(74) *Attorney, Agent, or Firm* — Mark H. Williams

(57) ABSTRACT

A sensor apparatus having a crimped housing and a method of assembling a sensor apparatus having a crimped housing are disclosed. The sensor apparatus comprises a sensor port, a tubular thin-walled housing coupled to the sensor port and comprising a crimping portion, a base portion, and a step feature that is formed in the housing, the step feature partitioning the crimping portion from the base portion, sensor components disposed within the interior of the base portion of the housing, and an electrical connector coupled the housing and comprising leads electrically coupled to the sensor components and a connector flange, wherein a rim of the crimping portion of the housing is crimped onto the connector flange such that the electrical connector is retained in the housing. Dimples, created by protrusions on the crimp dye, on both housing rim and connector flange assure the housing rim hold the connector in rotation direction.

18 Claims, 16 Drawing Sheets

(51) Int. Cl.
*G01L 23/26* (2006.01)
*G01L 9/00* (2006.01)
*G01L 19/06* (2006.01)

(52) U.S. Cl.
CPC ........... *H01R 13/502* (2013.01); *H01R 43/18* (2013.01); *G01L 9/0072* (2013.01); *G01L 19/069* (2013.01); *G01L 19/0654* (2013.01); *G01L 23/26* (2013.01)

(58) Field of Classification Search
CPC . G01L 19/003; G01L 19/0038; G01L 19/143; G01L 19/0654; G01L 19/069; G01L 19/142; G01L 19/0061; G01L 9/0072; G01L 23/26; G01K 1/08; H01R 13/502; H01R 43/18
See application file for complete search history.

(56) References Cited

U.S. PATENT DOCUMENTS

| | | | | |
|---|---|---|---|---|
| 6,055,864 A * | 5/2000 | Stiller | ................ | G01L 19/0084 73/718 |
| 6,506,069 B2 * | 1/2003 | Babala | ................. | G01L 19/003 439/248 |
| 8,459,125 B2 * | 6/2013 | Wade | ................. | G01L 19/0007 73/753 |
| 8,534,130 B2 * | 9/2013 | Eckhardt | ............ | G01L 19/0007 73/753 |
| 8,656,786 B2 * | 2/2014 | Jones | ................... | G01L 19/147 73/717 |
| 8,671,753 B2 * | 3/2014 | Eckhardt | ............ | H01R 13/5808 73/431 |
| 8,817,483 B2 * | 8/2014 | Eckhardt | ............... | G01L 19/003 361/753 |
| 8,934,263 B2 * | 1/2015 | Eckhardt | ............... | G01L 19/0654 361/796 |
| 2013/0000413 A1 | 1/2013 | Mitchell et al. | | |
| 2013/0031976 A1 * | 2/2013 | Eckhardt | ............ | H01R 13/5808 73/431 |
| 2013/0031984 A1 * | 2/2013 | Jones | ................... | G01L 19/148 |
| 2013/0031985 A1 * | 2/2013 | Wade | ................. | G01L 19/0007 73/753 |
| 2013/0031986 A1 * | 2/2013 | Eckhardt | ............ | G01L 19/0007 73/756 |
| 2013/0033830 A1 * | 2/2013 | Eckhardt | ............... | G01L 19/148 361/753 |

* cited by examiner provide a tubular housing on a sensor port, the housing comprising a crimping portion, a base portion, and a step feature that is formed in the housing, the step feature partitioning the crimping portion from the base portion
1310 insert at least a portion of an electrical connector to the housing, including disposing an annular flange of the electrical connector inside the crimp portion of the housing such that a bottom face of the flange contacts the step feature
1330 place a support dye around the base portion of the housing
1340 crimp the crimping portion of the housing on the flange such that a rim of the crimping portion is bent onto a top surface of the flange
1350

FIG. 13

```
┌─────────────────────────────────────────────────────────────────────┐
│ provide a tubular housing on a sensor port, the housing comprising  │
│ a crimping portion, a base portion, and a step feature that is      │
│ formed in the housing, the step feature partitioning the crimping   │
│ portion from the base portion                                       │
│                              1310                                   │
└─────────────────────────────────────────────────────────────────────┘
                                   │
                                   ▼
┌─────────────────────────────────────────────────────────────────────┐
│ insert at least a portion of an electrical connector to the housing,│
│ including disposing an annular flange of the electrical connector   │
│ inside the crimp portion of the housing such that a bottom face of  │
│ the flange contacts the step feature                                │
│                              1330                                   │
└─────────────────────────────────────────────────────────────────────┘
                                   │
                                   ▼
┌─────────────────────────────────────────────────────────────────────┐
│           place a support dye around the base portion of the housing│
│                              1340                                   │
└─────────────────────────────────────────────────────────────────────┘
                                   │
                                   ▼
┌─────────────────────────────────────────────────────────────────────┐
│ crimp the crimping portion of the housing on the flange such that   │
│ a rim of the crimping portion is bent onto a top surface of the     │
│ flange                                                              │
│                              1350                                   │
│  ┌───────────────────────────────────────────────────────────────┐  │
│  │ bend the rim of the crimping portion inward toward a          │  │
│  │ rotational axis of the housing such that the rim overhangs    │  │
│  │ the top surface of the flange                                 │  │
│  │                          1410                                 │  │
│  └───────────────────────────────────────────────────────────────┘  │
│                                │                                    │
│                                ▼                                    │
│  ┌───────────────────────────────────────────────────────────────┐  │
│  │ bend the edge of the rim toward the top surface of the flange │  │
│  │ such that the interior wall of the rim contacts the top       │  │
│  │ surface of the flange                                         │  │
│  │                          1420                                 │  │
│  └───────────────────────────────────────────────────────────────┘  │
└─────────────────────────────────────────────────────────────────────┘
```

FIG. 14

SENSOR APPARATUS HAVING A CRIMPED HOUSING AND A METHOD OF ASSEMBLING THE SAME

BACKGROUND

Sensor devices may be used to measure environmental conditions. For example, a pressure sensor device may be used in an industrial application to monitor and electrically convey pressure conditions to a remote location over a wired link or wireless connection. One type of pressure sensor apparatus includes multiple components. For example, a pressure sensor apparatus can include a metal base component and a shell to house pressure sensor electronics and a sense element. The pressure sensor electronics in the pressure sensor apparatus can be configured to receive a signal from the sense element (e.g., a capacitive sense element, resistive sense element, etc.). The sense element may detect a pressure of a fluid received through a conduit of the metal base component. The signal transmitted from the sense element to the pressure sensor electronics varies depending on the sensed pressure of the fluid. In addition to the metal base component, a pressure sensor apparatus can further include a connector component electrically coupled to the pressure sensor electronics.

During assembly of the pressure sensor apparatus, subsequent to insertion of the pressure sensor electronics, the connector component, and a portion of the connector apparatus into the shell, a part of the shell can be crimped over the portion of the connector apparatus in the shell to prevent removal of the connector component from the pressure sensor apparatus. Subsequent to crimping, the connector component firmly holds the pressure sensor electronics in the shell.

During operation, the pressure sensor electronics in the shell of the apparatus generate signals indicative of a sensed pressure. The pressure sensor electronics transmits the pressure information through wiring in the connector component to the remote location.

SUMMARY

Embodiments in accordance with the present disclosure are directed to a sensor apparatus having a crimped housing and a method of assembling a sensor apparatus having a crimped housing.

One embodiment in accordance with the present disclosure is directed to a sensor apparatus. The sensor apparatus comprises a sensor port and a tubular thin-walled housing coupled to the sensor port. The tubular housing includes a crimping portion, a base portion, and a step feature that is formed in the housing. The step feature partitions the crimping portion from the base portion. In this embodiment, the sensor components are disposed within the interior of the base portion of the housing. An electrical connector is coupled to the housing and comprises leads electrically coupled to the sensor components and a connector flange. A rim of the crimping portion of the housing is crimped onto the connector flange such that the electrical connector is retained.

The sensor components may include a sense element, electronic circuitry electrically coupled to the sense element, and a flexible printed circuit board electrically coupled to the electronic circuitry. The leads of the connector may contact the flexible printed circuit board. The sensor apparatus may further comprise sealant in the joint between the electrical connector and the crimping portion of the housing. The housing of the sensor apparatus may be welded to the sensor port.

In accordance with the principles of this disclosure, the housing may be formed by a stamping process. In some embodiments, the thickness of the housing wall in the base portion and the thickness of the housing wall in the crimping portion of the housing varies in accordance with a direction of the stamping process. When the direction of the stamping process is a first direction, the thickness of the housing wall in the base portion exceeds the thickness of the housing wall in the crimping portion. When the direction of the stamping process is a second direction, the thickness of the housing wall in the crimping portion exceeds the thickness of the housing wall in the base portion. The step feature of the housing may be an annular ledge, which supports the flange during crimping of the crimping portion. Alternatively, the step feature may be a plurality of protrusions formed on the interior surface of the housing corresponding to a plurality of recesses in the flange of the electrical connector.

The sensor apparatus may be a pressure sensor apparatus, in which the sensor components may include a sense element to measure pressure of a fluid and pressure sensor circuitry coupled to the sense element to convert the pressure sensed by the sense element into an electronic signal. The port may include a conduit for introducing the fluid to the sense element.

Another embodiment in accordance with the present disclosure is directed to a method of assembling a sensor apparatus having a crimped housing. The method comprises receiving a tubular housing on a sensor port. The housing includes a crimping portion, a base portion, and a step feature that is formed in the housing. The step feature partitions the crimping portion from the base portion. The method also includes disposing sensor components inside the housing and inserting at least a portion of an electrical connector to the housing, including disposing an annular flange of the electrical connector inside the crimping portion of the housing such that a bottom face of the flange contacts the step feature. The method further includes placing a support dye around the base portion of the housing and crimping the crimping portion of the housing on the flange such that a rim of the crimping portion is bent onto a top surface of the flange.

Crimping the crimping portion of the housing on the flange such that a rim of the crimping portion is bent into contact with a top surface of the flange may include bending, by a first crimp dye, the rim of the crimping portion inward toward a rotational axis of the housing such that the rim overhangs or contacts the top surface of the flange. In some embodiments, the first crimp dye includes dye protrusions that, during the crimping process, create one or more dimples in the rim of the crimping portion and corresponding dimples in the flange of the connector, such that rotation of the connector in the housing is inhibited. Crimping the crimping portion of the housing may further include bending, by one or more second crimp dyes, the edge of the rim toward the top surface of the flange such that the interior wall of the rim contacts the top surface of the flange. The first crimp dye may comprise a curved lip with a radial constraint section. In this embodiment, the crimping portion may be deformed in accordance with a curvature of the lip as the first crimp dye approaches the support dye during crimping, while the radial constraint section prevents bulging of the crimping portion. The one or more second crimp dyes may comprise a flat tip for pushing the rim of the crimping portion against the top surface of the flange subsequent to the bending by the first crimp dye. In an embodiment, bending, by the second crimp dye, includes retaining the first crimp dye in place such that the radial constraint section of the first crimp dye prevents bulging of the crimping portion. In another embodiment, bending, by the second crimp dye, includes not retaining the first crimp dye in place, wherein bulging of the crimping portion is provided by a radial constraint section of the second crimp dye.

The method may further include sealing the joint between the crimping portion and the electrical connector with sealant subsequent to crimping. The method may also further include welding the housing to the sensor port either prior to receiving the housing and sensor port or subsequent to crimping.

In accordance with the principles of this disclosure, the housing may be formed by a stamping process. In some embodiments, the thickness of the housing wall in the base portion and the thickness of the housing wall in the crimping portion of the housing varies in accordance with a direction of the stamping process. When the direction of the stamping process is a first direction, the thickness of the housing wall in the base portion exceeds the thickness of the housing wall in the crimping portion. When the direction of the stamping process is a second direction, the thickness of the housing wall in the crimping portion exceeds the thickness of the housing wall in the base portion. The step feature of the housing may be an annular ledge, which supports the flange during crimping of the crimping portion. Alternatively, the step feature may be a plurality of protrusions formed on the interior surface of the housing corresponding to a plurality of recesses in the flange of the electrical connector.

The assembled sensor apparatus may be a pressure sensor apparatus, and the sensor components include at least a sense element to measure pressure of a fluid and pressure sensor circuitry coupled to the sense element to convert the pressure sensed by the sense element into an electronic signal. The port may include a conduit for introducing the fluid to the sense element.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 13 is a flowchart to illustrate a particular implementation of a method of assembling a sensor apparatus having a crimped housing according to embodiments of the present disclosure;

FIG. 14 is a flowchart to illustrate another implementation of a method of assembling a sensor apparatus having a crimped housing according to embodiments of the present disclosure;

DETAILED DESCRIPTION

Figure 1:
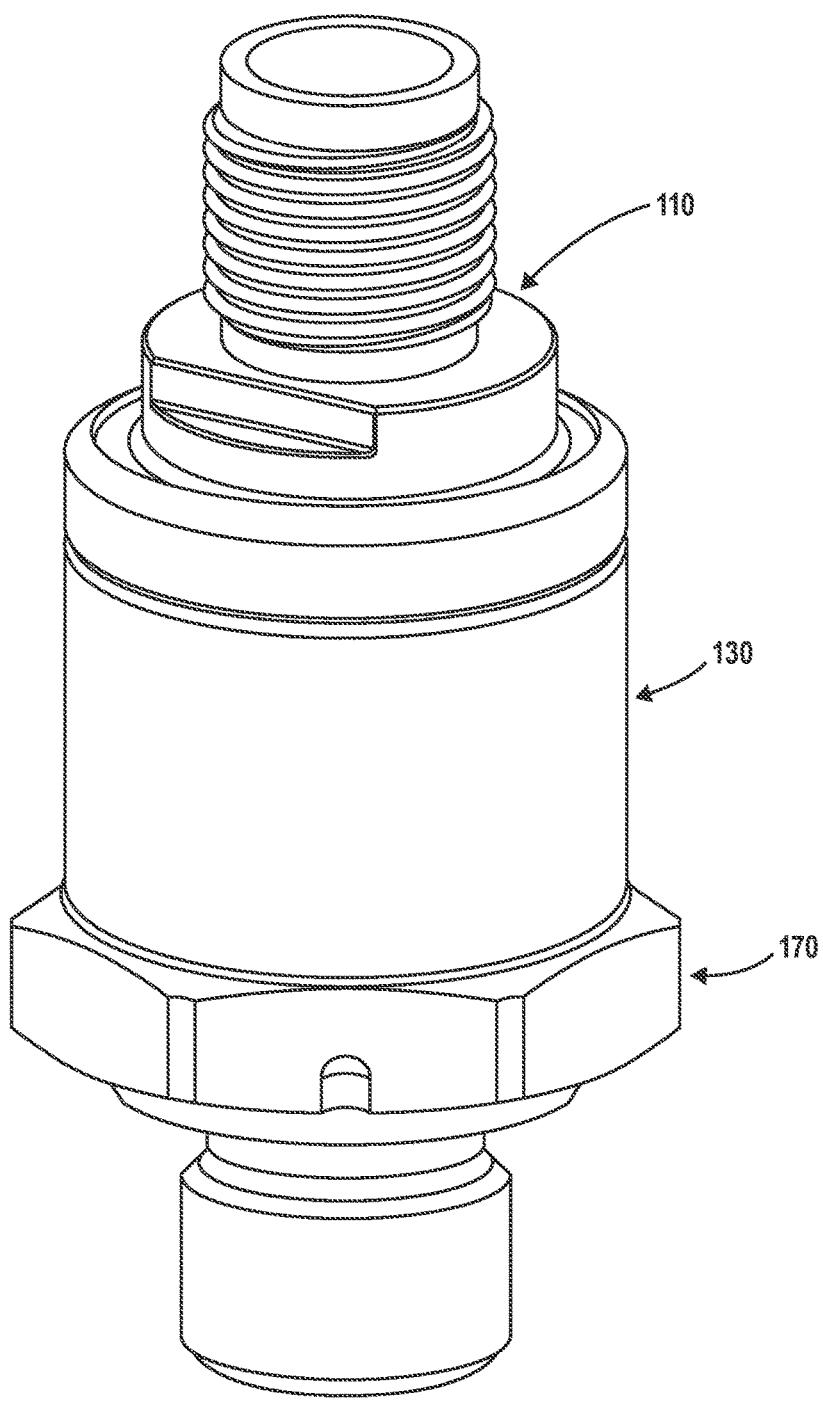
FIG. 1 is a diagram illustrating an isometric view of an assembled sensor apparatus according to embodiments of the present disclosure.

Crimping machines are used to make a rigid connection between a metallic and plastic part. For pressure sensors, for example, this crimping process is typically used to crimp a tubular housing around a flange of a plastic electrical connector. These housings, which are often machined housings, usually have a strong base at the bottom and a weak thin-walled region at the top to allow for a proper crimp around the top without buckling the bottom region. Present crimping processes do not allow for the crimping of a tubular housing with constant wall thickness because the bottom region will deform as easy as the top region due to equal stiffness in the two regions. Tubular housings can be made very thin when considering deep-drawn manufacturing processes, which are much cheaper than machining processes due to low material loss and high production rate. Accordingly, the present disclosure is directed to the use of crimping processes that allow a housing with a constant wall thickness to be crimped without buckling the non-crimped base region of the housing.

Embodiments in accordance with the present disclosure are directed to a sensor apparatus having a crimped housing and a method of crimping a housing of a sensor apparatus in which the benefits of a thin-walled stamped housing are realized. For example, in one embodiment, a tubular housing is welded to a sensor port. The housing comprises a crimping region, a base region, and a step feature that is formed in the housing. The step feature effectively partitions the crimping portion from the base portion. However, the wall thickness of the housing in the crimping region and the base region are generally equal, potentially with variations in thickness at certain local areas. Sensor components are disposed inside the cavity of the tubular housing in accordance with various known methods that will be recognized by those of skill in the art. At least a portion of an electrical connector is inserted into the housing. The portion that is included in the housing includes an annular flange, which is disposed inside the crimping region of the housing such that a bottom face of the flange contacts the step feature. A support dye may be placed around the base region of the housing to prevent buckling. The crimping region of the housing is then crimped on the flange such that a rim of the crimping region is bent onto the top surface of the flange.

In some embodiment, the crimping is performed by a single crimping dye. However, to reduce air volume between the rim of the housing and the flange, two crimping dyes may be used. In crimping process of this embodiment, a first crimp dye bends the rim of the crimping portion inward toward a rotational axis of the housing such that the rim overhangs or contacts the top surface of the flange. The first crimp dye may include dye protrusions that, during the crimping process, create one or more dimples in the rim of the crimping portion and corresponding dimples in the flange of the connector, such that rotation of the connector in the housing is inhibited. A second crimp dye bends the edge of the rim toward the top surface of the flange such that the interior wall of the rim contacts the top surface of the flange. The first crimp dye comprises a curved lip, in which the crimping portion is deformed in accordance with a curvature of the lip as the first crimp dye approaches the support dye during crimping. The first crimp dye further includes a radial constraint section that prevents outward bulging of the crimping portion during the crimping process. The second crimp dye comprises a flat tip for pushing the rim of the crimping portion against the top surface of the flange subsequent to the bending by the first crimp dye. The second crimp dye may also include a radial constraint section that prevents outward bulging of the crimping portion during the crimping process In one embodiment, subsequent to crimping, the joint between the crimping portion and the electrical connector, i.e., the area between the edge of the rim and the top surface of the connector flange, is sealed with sealant.

As previously mentioned, the housing may be a stamped metal housing, which has a lower production cost than a machined housing. The housing includes a step feature that is a protrusion or plurality of protrusions on the interior wall of the tubular housing. For example, the protrusion may be an annular ledge. As another example, the protrusion may be a plurality of protrusions on an inner circumference of the housing, which are in the same plane that is orthogonal to the axis of rotation of the housing. The step feature is formed at a plane of the housing that is proximal to the connector, effectively dividing the housing into two regions, such that the crimping region is smaller than the base region.

Another embodiment is directed to the sensor apparatus constructed using the above-described processes. For example, the sensor includes a sensor port and a tubular housing coupled to the sensor port and comprising a crimping region, a base region, and a step feature that is formed in the housing, the step feature partitioning the crimping region from the base region. The sensor includes sensor components disposed within the interior of the base region of the housing. An electrical connector is coupled to the housing and comprises leads electrically coupled to the sensor components. The connector includes a flange, and a rim of the crimping region of the housing is crimped onto the connector flange such that the electrical connector is retained in the housing. The sensor components include a sense element, electronic circuitry electrically coupled to the sense element, and may include a flexible printed circuit board electrically coupled to the electronic circuitry or flexible conducting wires with connectors to the electronic circuitry at one end. The leads of the connector may connect to other ends of the flexible conducting wires, or may electrically couple to the flexible printed circuit board via contact with the printed circuit board or via soldered wire and/or wire with connectors to the printed circuit board. The flexible printed circuit board allows for modular design of the sensor apparatus, such that different types of connectors may be coupled to the electronic sensor circuitry by selecting a corresponding configuration of the flexible printed circuit board. The different types of flexible printed circuit board have different configurations corresponding to the lead configuration of the connector, but each may use the same configuration to interface with the electronic sensor circuitry. A sealant may be used, subsequent to crimping the housing, around the joint between the connector flange and the crimping region to further protect the interior sensor components from outside elements.

In an embodiment, the sensor is a pressure sensor. The sensor components include at least a sense element to measure pressure of a fluid and pressure sensor circuitry coupled to the sense element to convert the pressure sensed by the sense element into an electronic signal, and the port includes a passage for introducing the fluid to the sense element. The electrical connector includes leads that electrically connect the sensor circuitry in the interior of the housing to outside equipment, for example, by a cable.

As previously mentioned, the housing of the sensor apparatus may be a stamped metal housing, which has a lower production cost than a machined housing. The housing includes a step feature that is a protrusion or plurality of protrusions on the interior wall of the tubular housing. For example, the protrusion may be an annular ledge. As another example, the protrusion may be a plurality of protrusions on an inner circumference of the housing, which are in the same plane that is orthogonal to the axis of rotation of the housing. The step feature is formed at plane of the housing that is proximal to the connector, effectively dividing the housing into two regions, such that the crimping region is smaller than the base region. In a particular embodiment, the wall thickness of the crimping region and the wall thickness of the base region may be substantially equal potentially with variations in thickness at local areas.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words defining orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always be on top).

FIG. 1 is a diagram illustrating an isometric view of an assembled sensor apparatus (100) having a crimped housing in accordance with the present disclosure. As one non-limiting example, the apparatus (100) may be a pressure sensor well-suited for industrial or automotive applications, or in heating, ventilation, and air conditioning (HVAC) systems. For example, the apparatus (100) may be used to detect coolant pressure, oil or fuel pressure, hydraulic pressure, and other fluid and gas pressures. As other non-limiting examples, the apparatus (100) may be a pressure switch, a temperature sensor, a combined temperature and pressure sensor, and other sensors that will occur to those of skill in the art. The apparatus (100) of FIG. 1 includes a connector (110) coupled to a thin-walled tubular housing (hereafter, "housing") (130). In a particular embodiment, the housing (130) may be a metal housing with a wall thickness between 0.2 mm and 2.0 mm. In FIG. 1, the housing (130) is seated on a port (170). For example, the connector (110) may be an electrical connector for connecting external components to electrical components contained within the housing (130), as will be explained in the following description. The port (170) may be a connector (e.g. a mechanical pressure connector) capable of connecting to a fluid channel and exposing sensor components within the housing (130) to a liquid or gas, as will be explained in the following description.

Figure 2:
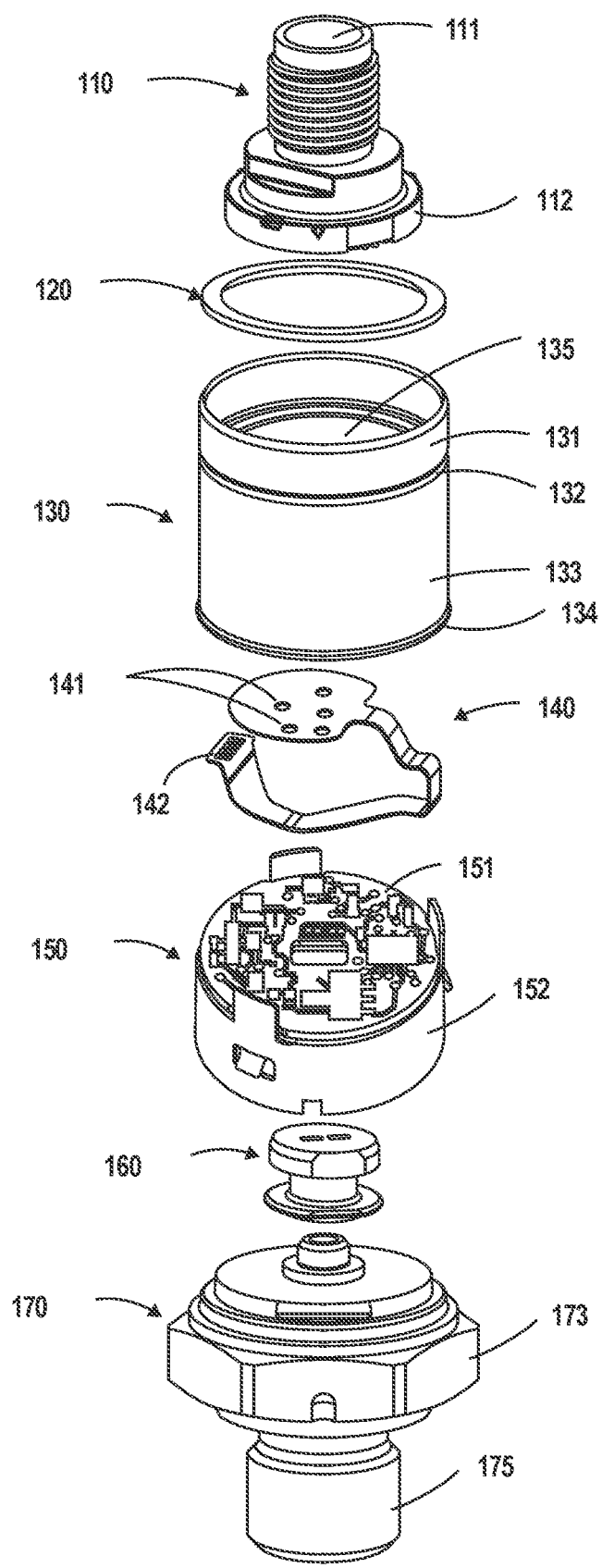
FIG. 2 is a diagram illustrating an isometric view of the sensor apparatus of FIG. 1 prior to assembly.

FIG. 2 is a diagram illustrating an isometric view of the sensor apparatus (100) of FIG. 1 prior to assembly. The connector (110) may be, for example, an electrical connector in accordance with well-known electrical connector packaging and interfaces. Examples of such electrical connectors include but are not limited to M12 type connectors, Metri-Pack type connectors, any DIN standard type connectors, Deutsch standard type connectors, or fly lead type connectors, and other such connectors as will be recognized by those of skill in the art. One or more electrical leads (118) (see FIG. 5) transmit electrical signals from electrical components within the housing (130) to external components. The connector (110) includes a connector flange (112) that sits inside the housing (130). The connector flange (112) provides a support around which the housing (130) may be crimped, as will be described in further detail herein.

The housing (130) may be a stamped metal housing with a crimping portion (131) and a base portion (133) separated by a step feature (132) useful to seating the connector (110) in the housing (130) and to crimping the crimping portion (131) of the housing (130) to the connector (110). The housing (130) may be further coupled to the port (170) by, for example, welding or crimping a bottom rim (134) of the base portion (133) of the housing (130) to the port (170). A cavity (135) of the housing (130) encloses a flexible circuit board (140), a circuit module (150), and a sense element apparatus (160). In some embodiments, a seal (120) may be applied to the connector (110) and the housing (130) to hermetically seal the cavity (135).

The flexible circuit board (140) may be configured in accordance with a pin configuration of the leads (118) (see FIG. 5) of the connector (110). That is, electrical contacts (141) in the flexible circuit board (140) are configured to receive electrical leads (118) of the connector (110). The flexible circuit board (140) includes a cable (142) for connection to the circuit module (150). The flexible circuit board (140) receives electrical signals from the circuit module (150) via the cable (142) and relays those signals to the electrical leads (118) of the connector (110). Thus, a flexible circuit board (140) corresponding to the type of the connector (110) may be used to adapt the connector (110) to the circuit module (150) without configuring the circuit module (150) for a specific type of connector. In some embodiments, the flexible circuit board (140) may be replaced with flexible conducting wires (not shown) that connect to the electrical leads (118) at one end and the circuit module (150) at the other end. The flexible conducting wires (not shown) may be connected to the electrical leads (118) and the circuit module (150) via connectors, soldering, or any other electrical connection method that will occur to those of skill in the art.

The circuit module (150) comprises circuitry (151) configured to process, transmit, and/or stores signals from the sense element (160). For example, the circuitry may be an application specific integrated circuit (ASIC) configured to convert signals from the sense element (160) into data understandable by an external component. The circuit module (150) may include a base (152) that supports the circuitry (151) within the housing (130). The base (152) may be seated on the port (170).

The sense element apparatus (160) is configured to sense the pressure of fluid within an axial passage (171) (see FIG. 5) of the port (170), and may have a lower surface exposed to fluid within the axial passage (171) of the port (170) or may be off center with respect to the axial passage (171). For example, the sense element apparatus (160) may include capacitive sense elements, resistive sense elements designed to measure to flexure of a diaphragm, or the like. The junction of the bottom of the sense element apparatus (160) and the port (170) may be sealed to prevent fluid within the axial passage (171) from flowing into the cavity (135) of the housing (130). The sense element apparatus (160) is coupled to the circuit module (150), which processes, transmits, and/or stores signals from the sense element (160).

The port (170) may be, for example, a pressure connector according to well-known pressure connector interfaces and thread sizes. Examples of such pressure connectors include G1/4A DIN3852-E, 7-16/20UNF, NPT1/4, or PT1/4 pressure ports, and other such connectors as will be recognized by those of skill in the art. As another example, the port (17) may be a temperature sensor port. The port (170) includes a port connector (175) that may be inserted into a fluid channel for detecting, for example, the pressure or temperature of the fluid in that channel. The port connector (175) of the port (170) may introduce fluid from the fluid channel to the sense element apparatus (160) through an axial passage (171) in the port (170). The port (170) can be made of any suitable material such as brass, copper, alloy, moldable plastic, etc. In one embodiment, the port (170) is milled out of metal such as brass, aluminum, copper, stainless steel, etc. The port (170) may include a hexagonal flange (173) or other suitable pattern to enable application of torque.

Figure 3:
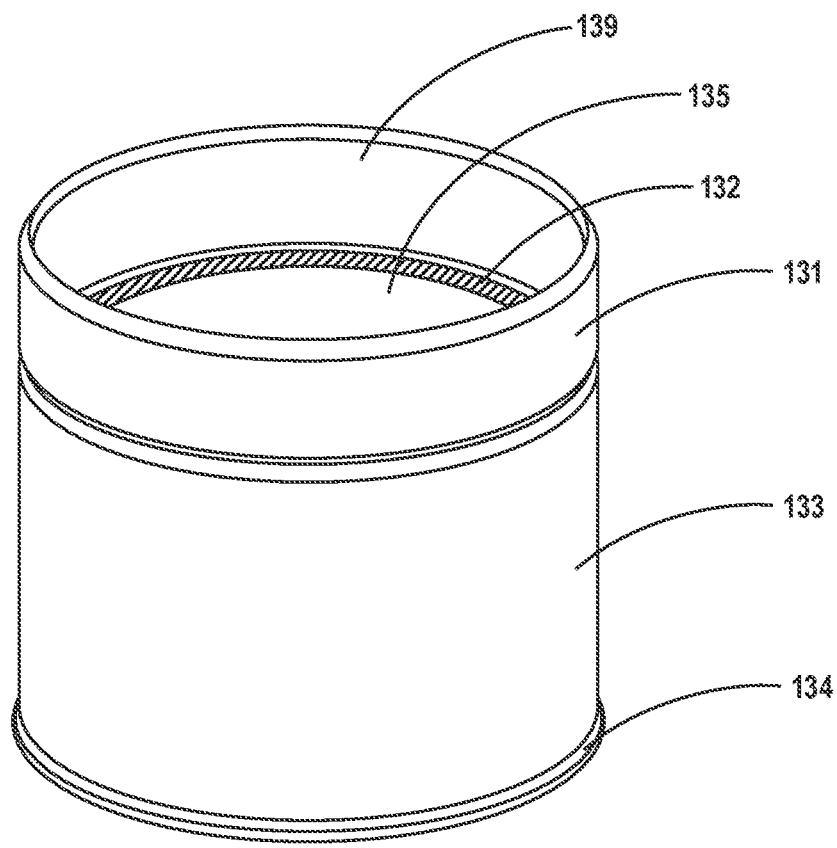
FIG. 3 is a diagram illustrating an isometric view of a particular embodiment of a sensor apparatus housing according to embodiments of the present disclosure.

For further explanation, FIG. 3 illustrates an enlarged view of the housing (130). The housing (130) may be a cylinder, tube, or other suitable shape with an open cavity (135). The housing (130) includes the crimping portion (131), which is a deformable portion of the housing that is suitable to bending and crimping. The crimping portion (131) includes an interior wall (139) that comes into contact with the connector flange (112) during a crimping process (see FIG. 4). The housing (130) further includes the base portion (133), in which sensor components are housed. The housing (130) further includes the step feature (132), which may be for example, an annular ledge or a plurality of protrusions. In the example shown in FIG. 3, the step feature (132) is shown as an annular ledge. The step feature (132) provides support against which the connector flange (112) is held during crimping, and also prevents the connector (110) from being pushing into the housing (130). The step feature (132) also provides both bending and torsional stiffness to the thin-walled housing, giving enhanced load absorbance in all six degrees-of-freedom. For example, the step feature (132) may be an annular ledge that acts as a spring to absorb axial loads and preload the housing (130) in the axial direction to provide a higher friction torque when a torque is applied to the connector (110). When the connector (110) is made from plastic, the connector (110) can creep (relaxation) due to the crimp force. The spring pre-load feature will hold the connector (110) better over life and therefore a higher anti rotation torque. The housing (130) may be formed of metal by a stamping process. The step feature (132) may be created on the inner wall of the housing (130) based on any suitable metalworking operation. The housing (130) may couple to a port by, for example, welding or crimping a bottom rim (134) of the base portion (133) of the housing (130) to the port.

Figure 4:
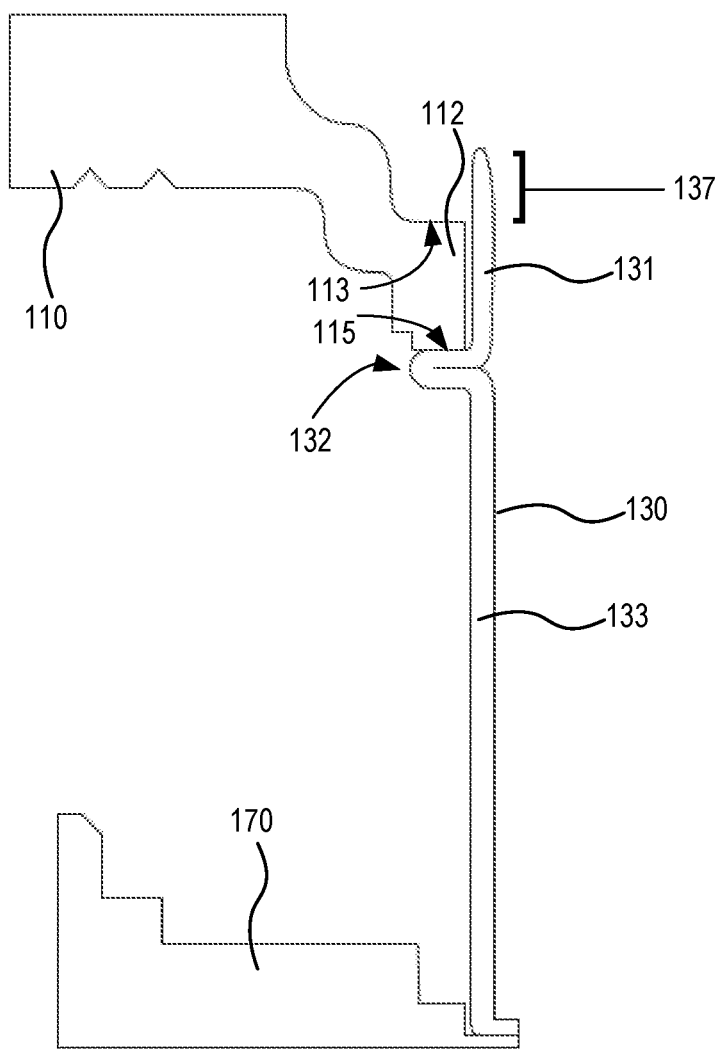
FIG. 4 is a diagram illustrating a partial cross-section view of a sensor apparatus prior to crimping according to embodiments of the present disclosure.

For further explanation, FIG. 4 illustrates a cross section view of the housing (130) and the connector (110) prior to crimping. As can be seen in FIG. 4, the connector flange (112) is disposed within the cavity (135) inside the crimping portion (131) of the housing (130). A top surface (113) of the connector flange rests below an upper rim (137) of the crimping portion (131) of the housing (130). A bottom surface (115) of the connector flange (112) contacts and rests upon the step feature (132) of the housing (130). During a crimping process, the rim (137) is turned inward toward the rotational axis of the housing, and downward toward the top surface (113) of the connector flange (112). Also, during the crimping process, the step feature (132) provides an opposing force to the crimping force such that the connector (110) is not pushed into the housing (130). The housing (130) may be formed from a stamping process. As such, the thickness of the housing wall in the crimping portion (131) of the housing (130) may be generally equal to the thickness of the housing wall in the base portion (133) of the housing (130), with minor variations in thickness at local areas. However, the thickness of the housing wall in the base portion (133) and the thickness of the housing wall in the crimping portion (131) may vary in accordance with a direction of the stamping process. When the direction of the stamping process is a first axial direction such that the face of a punch (not shown) approaches the housing (130) to encounter the base portion (133) of the housing (130), the thickness of the housing wall in the base portion (133) exceeds the thickness of the housing wall in the crimping portion (131). When the direction of the stamping process is a second axial direction such that the face of a punch (not shown) approaches the housing (130) to encounter the crimping portion (131) of the housing (130), the thickness of the housing wall in the crimping portion (131) is thicker than the thickness of the housing wall in the base portion (133). Moreover, the thickness of the housing wall in the rim (137) may be thinner relative to the thickness of the housing wall in the rest of the crimping portion (131), and the thickness of the housing wall in the bottom rim (134) may be thinner relative to the thickness of the housing wall in the rest of the base portion (133). During crimping, the base portion (133) of the housing (130) may be supported by a reinforcing dye that prevents the base portion (133) from buckling during the application of crimping force to the crimping portion (131).

Figure 5:
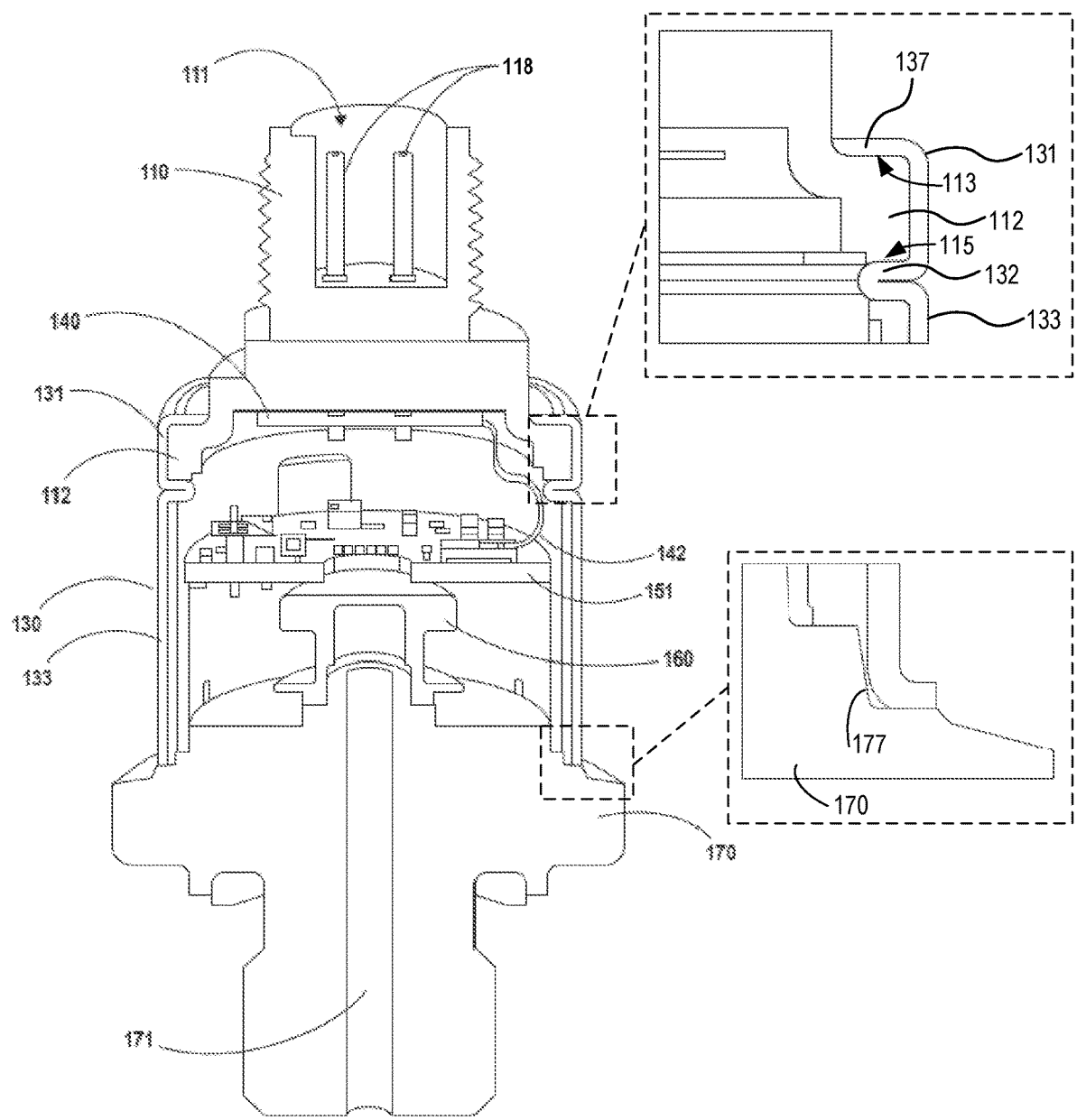
FIG. 5 is a diagram illustrating a partial cross-section view of a sensor apparatus subsequent to crimping according to embodiments of the present disclosure.

For further explanation, FIG. 5 illustrates a cross-section view of the apparatus (100) from FIGS. 1 and 2, from which the same numbering is adopted to represent the same. As can be seen in FIG. 5, the electrical leads (118) axially extend through the connector (110) from the interior cavity (135) of the housing (130) to a receptacle area (111) that receives, for example, a female plug (not shown) of an external component. As can also be seen in FIG. 3, the port (170) includes an axial passage (171) for introducing fluid from a fluid channel to the sense element apparatus (160). The axial passage (171) may be, for example, a bore hole.

As can be seen from the detail of FIG. 5, after crimping, the rim (137) of the crimping portion (131) of the housing (130) has been bent inward and downward such that the interior wall of the rim (137) is in full contact with the top surface (113) of the connector flange (112). Further, it can be seen that the bottom surface (115) of the connector flange (112) contacts and rests upon the step feature (132).

As can be seen from the detail of FIG. 5, in one embodiment, the port (170) includes a weld rim (177). The housing (130) may be welded to the port (170) at the weld rim (177). In other embodiments, the housing (130) may be coupled to the port (170) in other ways that will occur to those of skill in the art.

Figure 6:
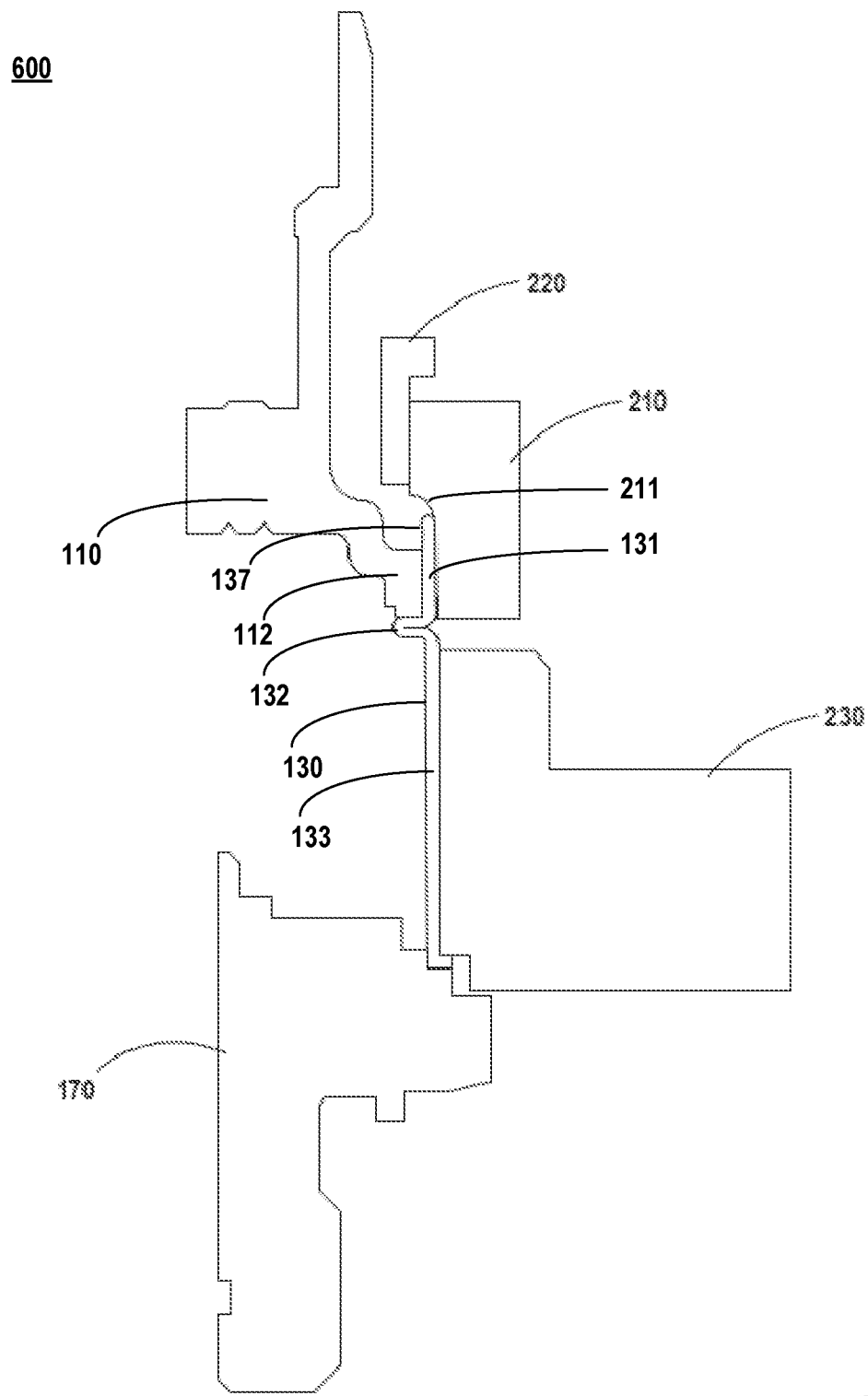
FIG. 6 is a diagram illustrating a partial cross-section view of an apparatus for crimping a sensor apparatus housing according to embodiments of the present disclosure.

Referring now to FIG. 6, a partial cross section view of a system (600) for crimping a sensor housing in accordance with the present disclosure is shown. FIG. 6 shows the connector (110) partially inserted into the housing (130), such that the connector flange (112) is entirely contained within the crimping portion (131) of the housing (130). The housing (130) is seated on the port (170). FIG. 6 shows the system for crimping the sensor at a point prior to beginning the crimping process. It can be seen that the connector flange (112) sits below the rim (137) of the housing.

In the system of FIG. 6, a base support dye (230) is placed around the base portion (133) of the housing (130). The base support dye (230) may be, for example, two semicircular dies that are clamped together. A primary crimping dye (210) is also provided. The primary crimping dye (210) includes a curved lip (211) that engages the rim (137) of the crimping portion (131) of the housing (130) as the primary crimping dye (210) is pressed onto the housing, i.e., as the primary crimping dye (210) approaches the base support dye (230). The primary crimping dye (210) is capable of providing support to the crimping portion (131) to prevent outward radial bulging of the crimping portion (131) as the rim (137) is crimped inward. In an embodiment, a secondary crimping dye (220) is also provided. The secondary crimping dye (220) includes a flat face that presses down on the rim (137) of the crimping portion (131) of the housing (130) in order to press and substantially flatten the inner wall of the rim (137) against the top surface (113) of the connector flange (112). The secondary crimping dye (220) may be used in conjunction with the primary crimping dye (210), such that the primary crimping dye (210) provides support to prevent outward radial bulging of the crimping portion (131) during the application of crimping force by the secondary crimping dye (220). In some embodiments, the secondary crimping dye (210) is used apart from the first crimping dye (210), and includes support (see FIG. 10) to prevent outward radial bulging of the crimping portion (131).

While FIG. 6 shows a partial-cross section of the system (600), readers of skill in the art will appreciate that the primary crimping dye (210), secondary crimping dye (220), and base support dye (230) circumferentially engage the housing (130).

Figure 7:
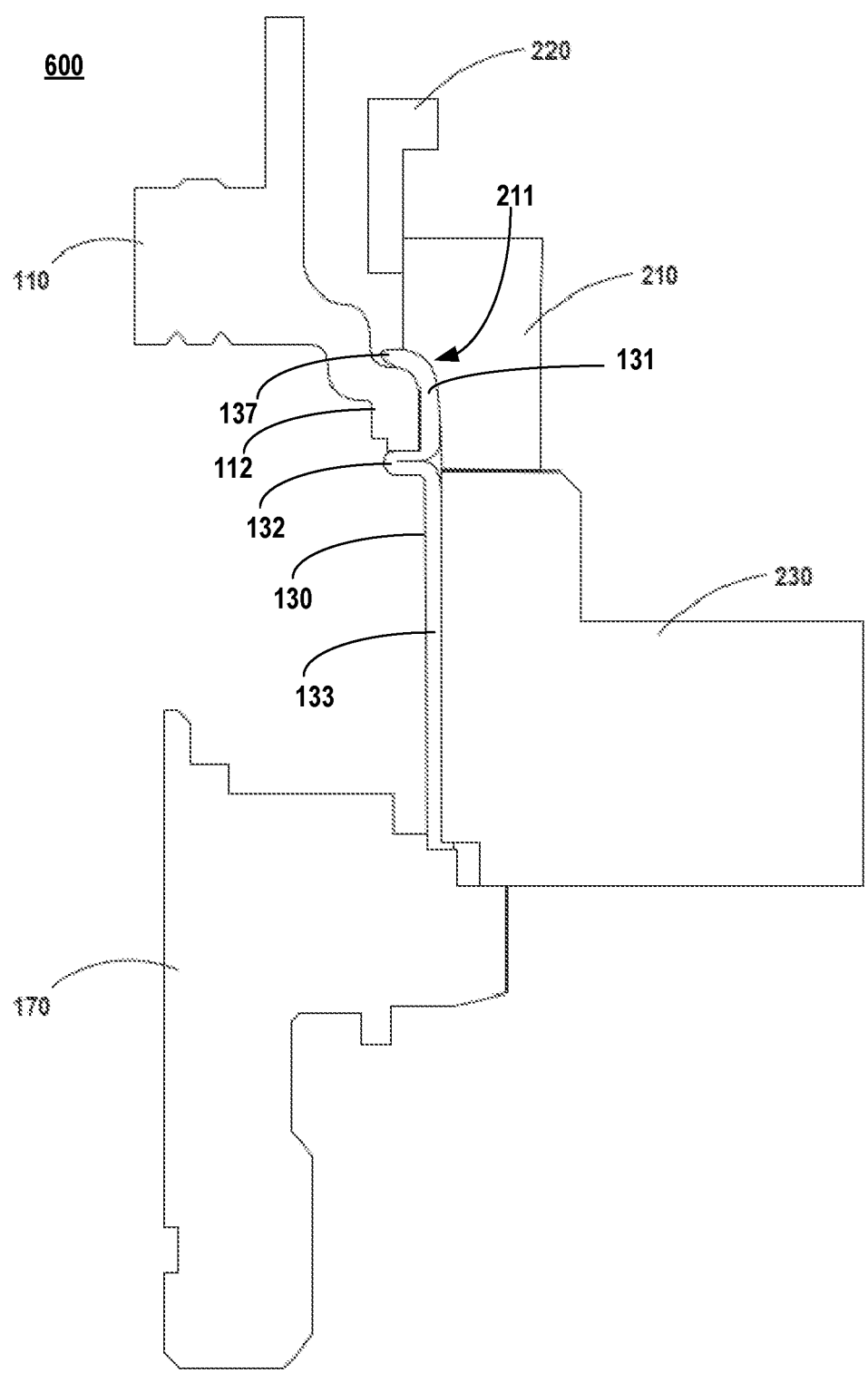
FIG. 7 is a diagram illustrating a partial cross-section view of an apparatus for crimping a sensor apparatus housing according to embodiments of the present disclosure.

Referring now to FIG. 7, a partial cross section view of the system (600) for crimping a sensor housing in accordance with the present disclosure is shown. Like FIG. 6, FIG. 7 shows the connector (110) partially inserted into the housing (130), such that the connector flange (112) is entirely contained within the crimping portion (131) of the housing (130). The housing (130) is seated on the port (170). However, FIG. 7 shows the system (600) after the application of crimping force by the primary crimping dye (210) has completed. It can be seen from FIG. 7 that the rim (137) of the crimping portion (131) of the housing (130) has deformed in accordance with the curvature of the lip (211) of the primary crimping dye (210). It can be further seen from FIG. 7 that the rim (137) has curved inward on and now overhangs the connector flange (112). Here, the connector (110) is now fixed in the housing (130). To reduce the air volume between the rim (137) and the top surface (113) of the connector flange (112), a second crimping action may be performed by the secondary crimping die.

While FIG. 7 shows a partial-cross section of the system (600), readers of skill in the art will appreciate that the primary crimping dye (210), secondary crimping dye (220), and base support dye (230) circumferentially engage the housing (130).

Figure 8:
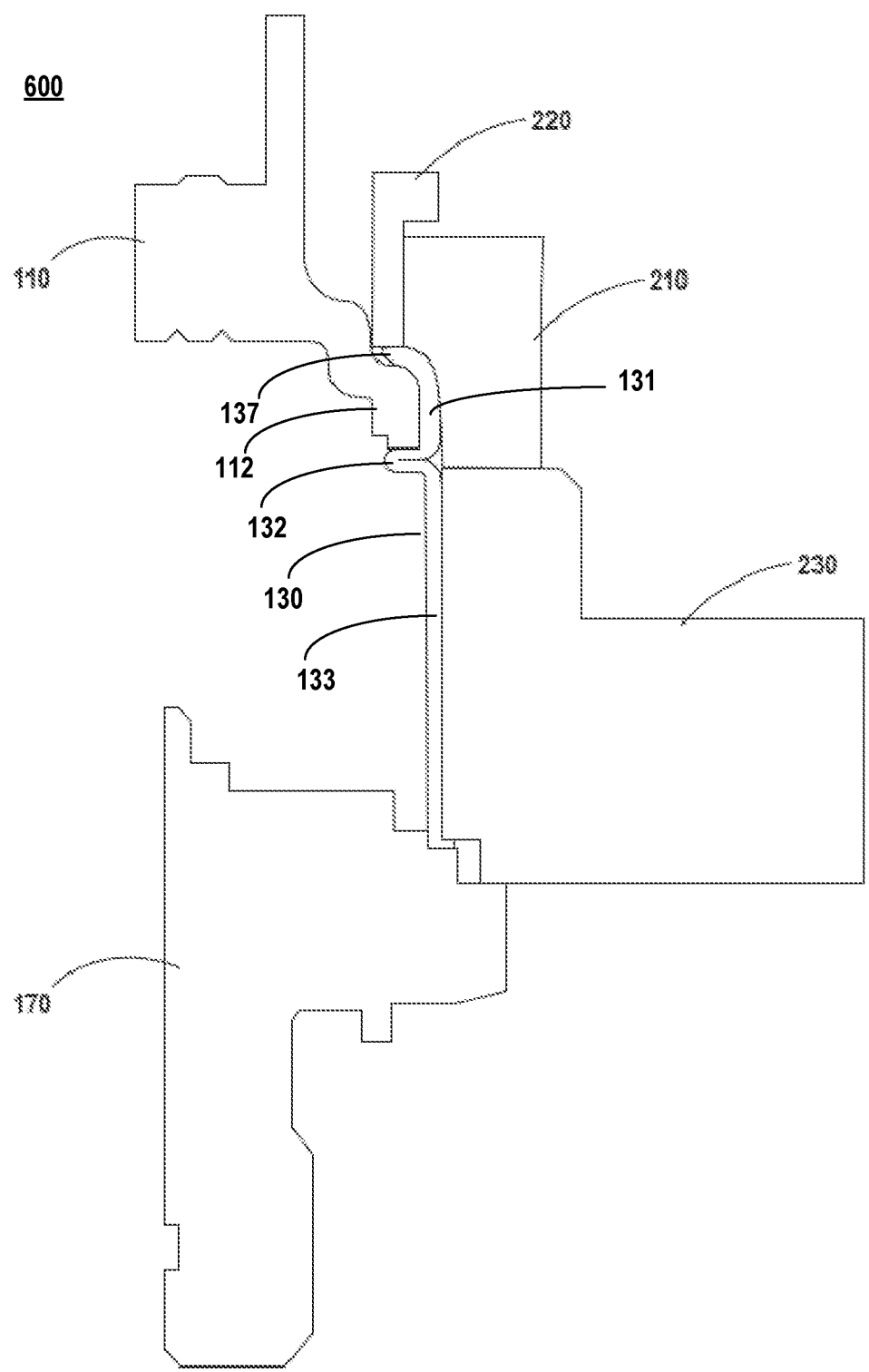
FIG. 8 is a diagram illustrating a partial cross-section view of an apparatus for crimping a sensor apparatus housing according to embodiments of the present disclosure.

Referring now to FIG. 8, a partial cross section view of the system (600) for crimping a sensor housing in accordance with the present disclosure is shown. Like FIG. 7, FIG. 8 shows the connector (110) partially inserted into the housing (130), such that the connector flange (112) is entirely contained within the crimping portion (131) of the housing (130). The housing (130) is seated on the port (170). However, FIG. 8 shows the system (600) after the application of a second crimping force by the secondary crimping dye (220) has completed. It can be seen from FIG. 8 that the rim (137) of the crimping portion (131) of the housing (130) has been further deformed by the flat face of the secondary crimping dye (220), such that the interior wall of the rim (137) is now substantially parallel to and in contact with the top surface (113) of the connector flange (112).

While FIG. 8 shows a partial-cross section of the system (600), readers of skill in the art will appreciate that the primary crimping dye (210), secondary crimping dye (220), and base support dye (230) circumferentially engage the housing (130).

After the crimping has completed, a seal (120) (see FIG. 2) made of material such as silicone, glue, etc., can be applied around an entire circumference between the connector (110) and the crimping portion (131) of the housing (130) to form an additional seal, preventing liquid, water, air or matter from entering the cavity (135) of the housing (130) subsequent to crimping.

Figure 9:
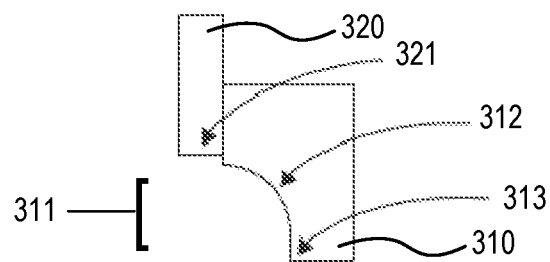
FIG. 9 is a diagram illustrating an exemplary crimping dye according to embodiments of the present disclosure.

Referring now to FIG. 9, a primary crimping dye (310) and a secondary crimping dye (320) in accordance with one embodiment the present disclosure are shown. The primary crimping dye (310) includes a crimp limp (311) with a curvature (312) that, in operation, curves toward a radial axis of a housing being crimped. The primary crimping dye (310) further includes a radial constraint portion (313) that provides radial support to a crimping portion of a housing during the first crimping action by the primary crimping dye (310). The radial constraint portion (313) also provides radial support to the crimping portion of the housing during the second crimping action by the secondary crimping dye (320). The secondary crimping dye (320) includes a flat push down tip (321) that pushes a rim of a crimping portion of a housing down toward a flange of a connector during a second crimping action.

Figure 10:
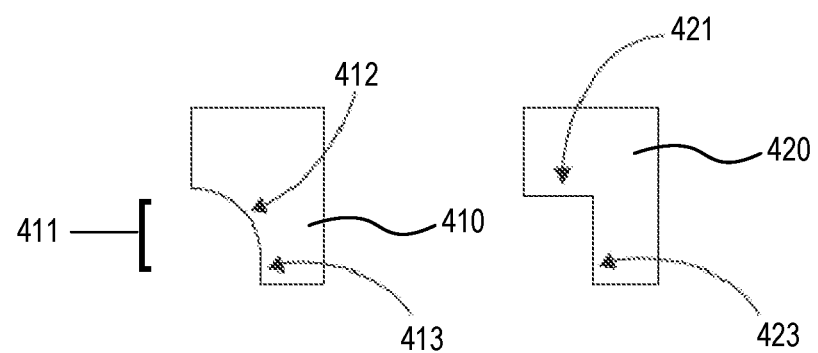
FIG. 10 is a diagram illustrating another exemplary crimping dye according to embodiments of the present disclosure.

Referring now to FIG. 10, a primary crimping dye (410) and a secondary crimping dye (420) in accordance with another embodiment the present disclosure are shown. Unlike the secondary crimping dye (320) of FIG. 9, the secondary crimping dye (420) of FIG. 10 is used in a second crimping action that is entirely separate from the first crimping action, i.e., after the first crimping action has been completed and the primary crimping dye (410) has released the housing. The primary crimping dye (410) includes a crimp limp (411) with a curvature (412) that, in operation, curves toward a radial axis of a housing being crimped. The primary crimping dye (410) further includes a radial constraint portion (413) that provides radial support to a crimping portion of a housing during the first crimping action by the primary crimping dye (410). The secondary crimping dye (420) includes a flat push down tip (421) that pushes a rim of a crimping portion of a housing down toward a flange of a connector during a second crimping action. The secondary crimping dye (420) further includes radial constraint portion (423) that provides radial support to the crimping portion of the housing during the second crimping action by the second crimping dye (420).

Figure 11:
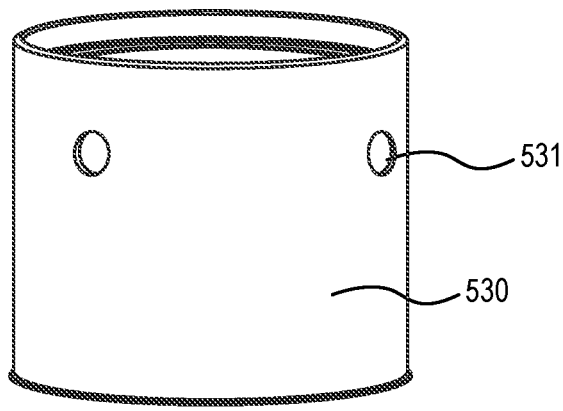
FIG. 11 is a diagram illustrating perspective view of another exemplary sensor apparatus housing according to embodiments of the present disclosure.

Referring now to FIG. 11, a perspective view of a housing (530) in accordance with another embodiment of the present disclosure is shown. The housing (530) includes the step feature (132) as a plurality of indentations (531) formed on the exterior of the housing, which are translated through the wall of the housing as protrusions (539) (see FIG. 18) on the interior wall of the housing. The plurality of indentations (531) formed on the exterior and interior of the housing may also provide both bending and torsional stiffness to the thin-walled housing, giving enhanced load absorbance in all six degrees-of-freedom. The indentations (531) may be formed by methods of metal working that will be recognized by those of skill in the art. For example, the plurality of indentations (531) may be formed in the housing by pushing a tool in radial direction inward in the thin shell housing wall, after the connector has been assembled (not shown). The protrusions (539) on the interior of the housing formed by the indentations (531) are arranged to correspond to recesses in the flange of a connector (not shown), such that the connector is seated on the protrusions on the interior wall of the housing formed by the indentations (531).

Figure 18:
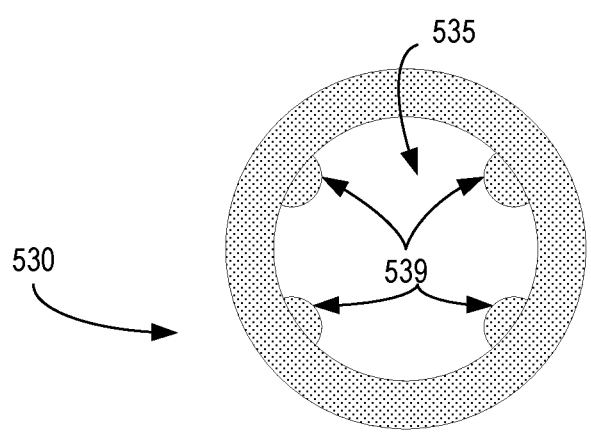
FIG. 18 is a diagram illustrating a perspective view of another exemplary sensor apparatus housing according to embodiments of the present disclosure.

Referring now to FIG. 18, a plan view of the housing (530) is shown. The interior wall (537) of the cavity (535) of the housing (530) includes protrusions (539) corresponding to the indentations (531) seen in FIG. 11. Each protrusion (539) corresponds to and aligns with a recess (not shown) on a bottom facet of the connector flange (112). The recesses may be, for example, indentations in the flange (112), such that each recess in the flange sits on a protrusion (539) when the connector is inserted into the cavity with the recesses (not shown) and protrusions (539) in alignment.

Figure 12:
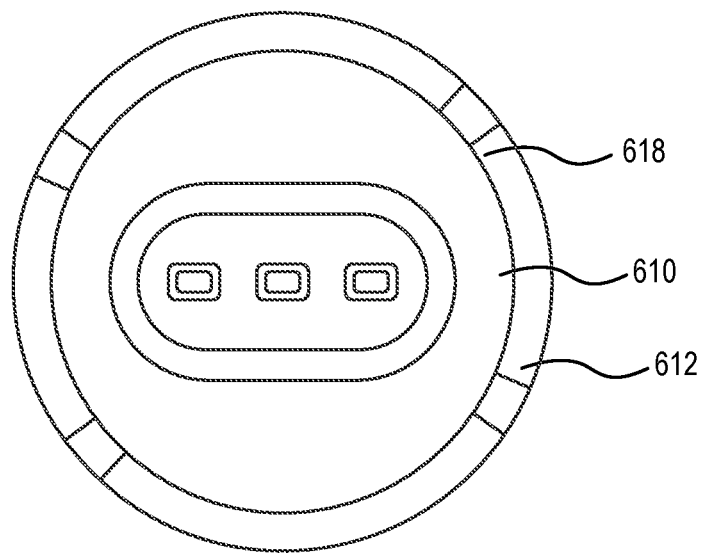
FIG. 12 is a diagram illustrating top plan view of a connector according to embodiments of the present disclosure.

Referring now to FIG. 12, a connector (610) in accordance with another embodiment of the present disclosure is shown. FIG. 12 shows the top facet of the connector. The connector (610) may be pre-formed with anti-rotation dimples (618) in the flange (612) of the connector (610). While shown on the top facet of the connector (610), the anti-rotation dimples (618) may be additionally or alternatively on the on the bottom facet of the connector (610) (not shown). When the anti-rotation dimples are on the bottom side of the flange (612), these anti-rotation dimples may have such a shape that these are the negative shape of the plurality of protrusions (539) formed on the interior of the housing (not shown) The first crimp dye may include dye protrusions that, during the crimping process, create one or more corresponding dimples in the rim of the crimping portion that engage dimples (618) in the flange (612) of the connector (610), such that rotation of the connector (610) in the housing is inhibited.

For further explanation, FIG. 13 sets forth a flow chart illustrating an exemplary method for assembling a sensor with a crimped housing according to embodiments of the present invention that includes receiving (1310) a stamped tubular housing on a sensor port, the housing comprising a crimping portion, a base portion, and a step feature that is formed in the housing, the step feature partitioning the crimping portion from the base portion. Receiving (1310) a stamped tubular housing on a sensor port, the housing comprising a crimping portion, a base portion, and a step feature that is formed in the housing, the step feature partitioning the crimping portion from the base portion may be carried out by an assembler receiving a housing (130) seated on a port (170) (see FIG. 2). The housing (130) may be coupled to the port (170), for example, by welding, prior to the assembler receiving the housing (130) and the port (170) or in a subsequent step. The housing (130) may be a cylinder, tube, or other suitable shape with an open cavity (135). The housing (130) includes the crimping portion (131), which is a deformable portion of the housing that is suitable to bending and crimping (see FIG. 3). The housing (130) further includes the base portion (133), in which sensor components are housed (see FIG. 3). The housing (130) further includes the step feature (132), which may be for example, an annular ledge or a plurality of protrusions. The step feature (132) may be created on the inner wall of the housing (130) based on any suitable metalworking operation prior to the assembler receiving the housing (130) and port (170).

In the exemplary method of FIG. 13 further the housing and sensor port may be provided with sensor components already disposed inside the housing such as by the assembler inserting a sensor element (160) into the cavity (135) of the housing (130) (see FIG. 2). The assembler then inserts the pressure sensor circuitry (150) into the cavity (135) over the sensor element (160) (see FIG. 2).

The exemplary method of FIG. 13 further includes inserting (1330) at least a portion of an electrical connector to the housing, including disposing an annular flange of the electrical connector inside the crimping portion of the housing such that a bottom face of the flange contacts the step feature. Inserting (1330) at least a portion of an electrical connector to the housing, including disposing an annular flange of the electrical connector inside the crimping portion of the housing such that a bottom face of the flange contacts the step feature, may be carried out by the assembler inserting at least a portion (i.e., the flange (112)) of the connector (110) into the cavity (135) of the housing (130) over the pressure sensor circuitry (150) (see FIG. 2). The connector is aligned with the flexible printed circuit board (140) such that the leads (118) of the connector make electrical contact with conductors (141) on the flexible printed circuit board (140). A top surface (113) of the connector flange rests below an upper rim (137) of the crimping portion (131) of the housing (130) (see FIG. 4). A bottom surface (115) of the connector flange (112) contacts and rests upon the step feature (132) of the housing (130) (see FIG. 4).

Figure 15:
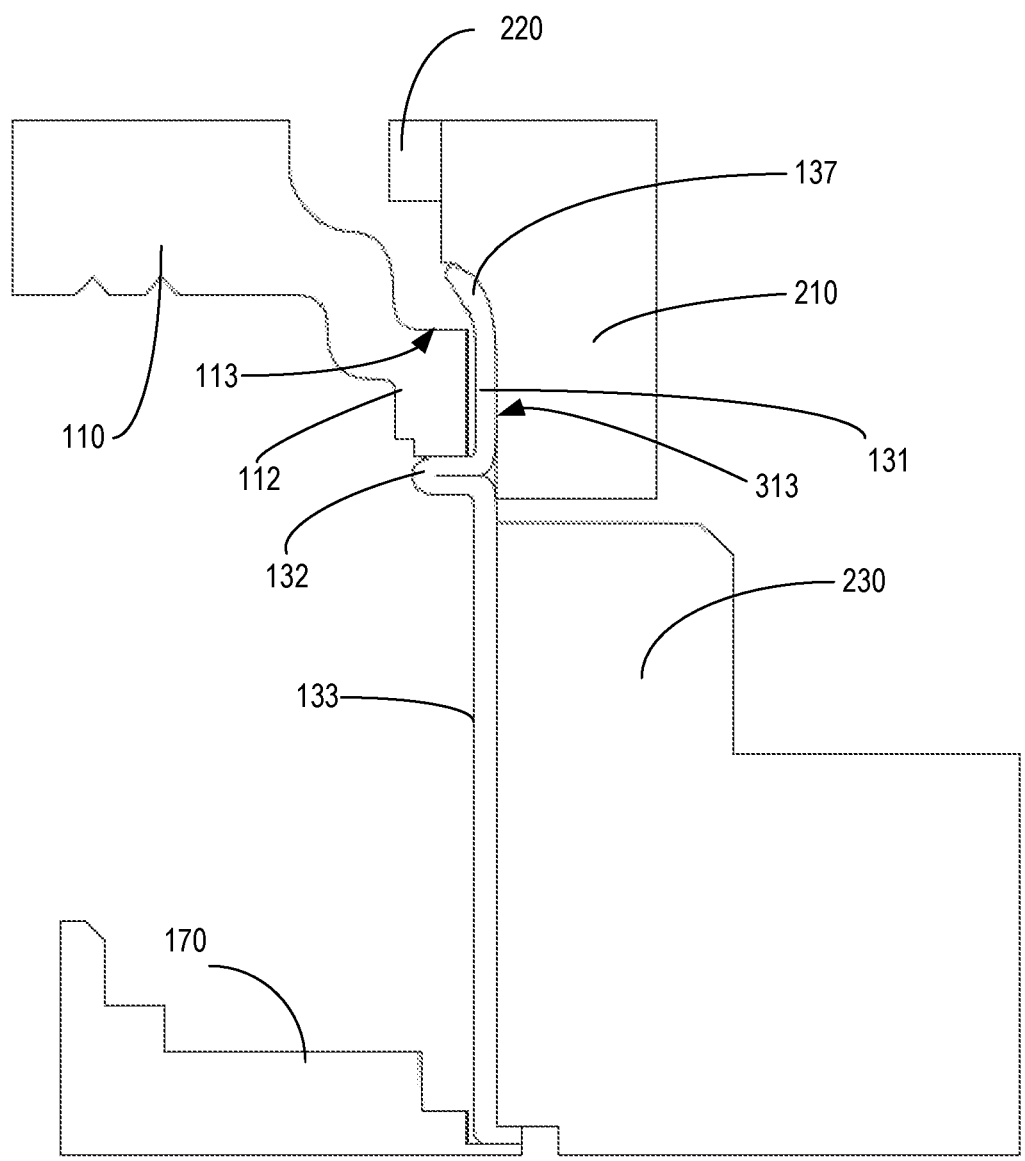
FIG. 15 is a diagram illustrating a partial cross-section view of an apparatus for crimping a sensor apparatus housing according to embodiments of the present disclosure.

The exemplary method of FIG. 13 further includes placing (1340) a support dye around the base portion of the housing. Placing (1340) a support dye around the base portion of the housing may be carried out by an assembler placing the base support dye (230) around the base portion (133) of the housing (130) (see FIG. 15). The base support dye (230) may be, for example, two semicircular dies that are clamped together.

Figure 16:
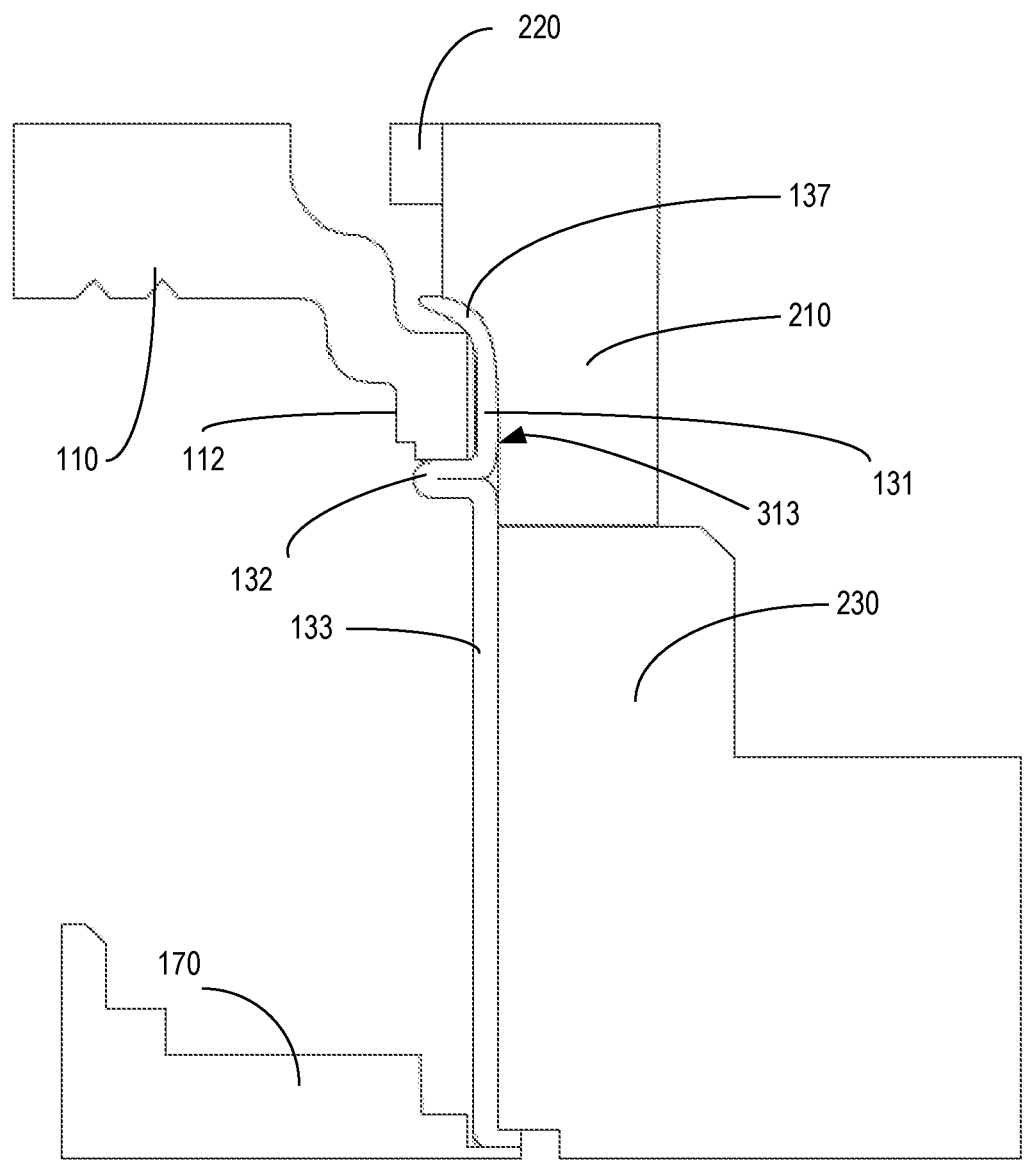
FIG. 16 is a diagram illustrating a partial cross-section view of an apparatus for crimping a sensor apparatus housing according to embodiments of the present disclosure.

The exemplary method of FIG. 13 further includes crimping (1350) the crimping portion of the housing on the flange such that a rim of the crimping portion is bent onto a top surface of the flange. Additional reference is made to FIGS. 15 and 16. Crimping (1350) the crimping portion of the housing on the flange such that a rim of the crimping portion is bent onto a top surface of the flange may be carried out by lowering a dye press comprising at least one dye (210) onto the crimping portion (131) of the housing (130) such that the rim (137) of the crimping portion (131) is turned inward toward the rotational axis of the housing, and downward toward the top surface (113) of the connector flange (112) (see FIG. 15). The first crimping action is complete, for example, when the primary dye (210) contacts the base support dye (230) (see FIG. 16).

For further explanation, FIG. 14 sets forth a flow chart illustrating another exemplary method for assembling a sensor with a crimped housing according to embodiments of the present invention. Like FIG. 13, FIG. 14 includes receiving (1310) a stamped tubular housing on a sensor port, the housing comprising a crimping portion, a base portion, and a step feature that is formed in the housing, the step feature partitioning the crimping portion from the base portion, placing (1340) a support dye around the base portion of the housing, crimping (1350) the crimping portion of the housing on the flange such that a rim of the crimping portion is bent onto a top surface of the flange.

Figure 17:
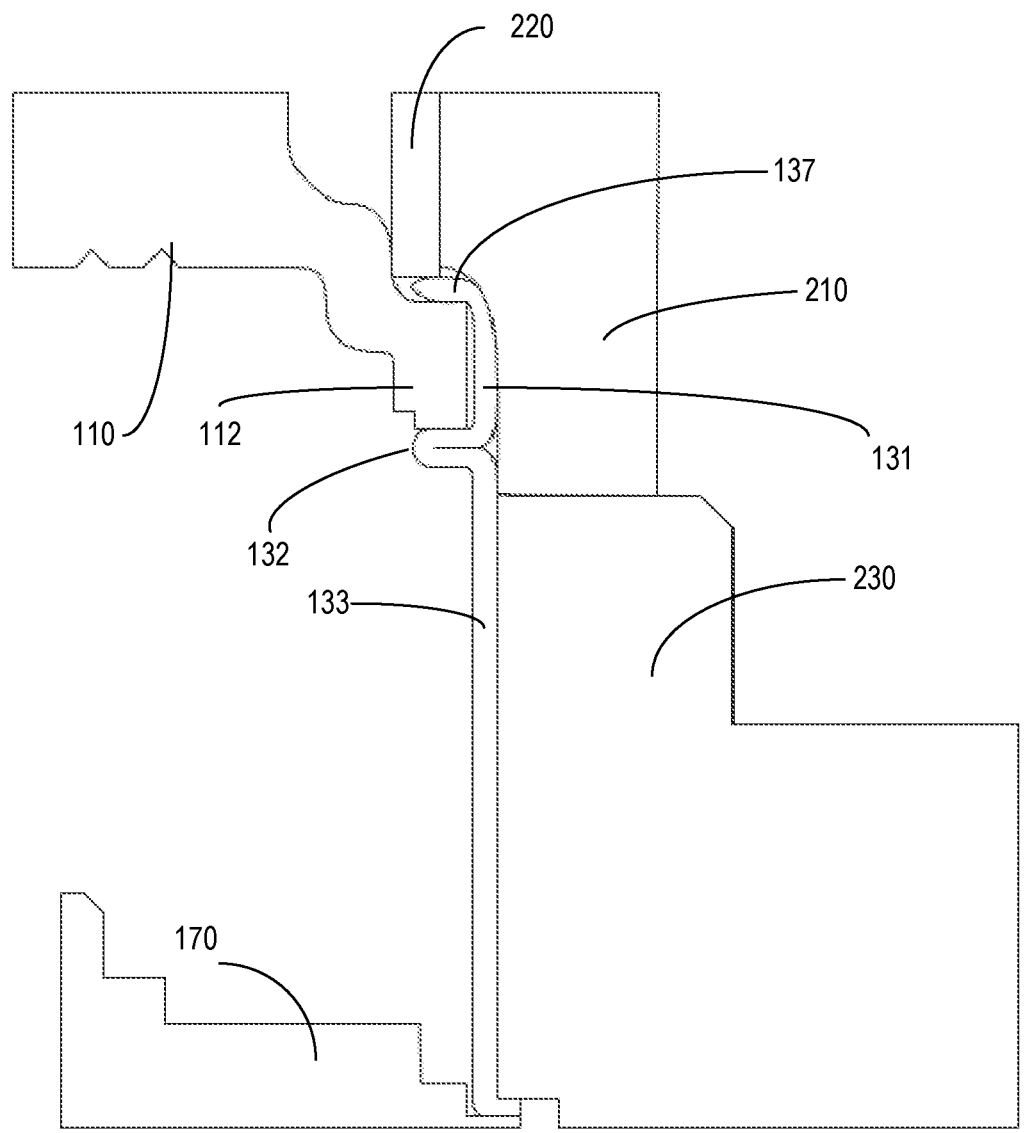
FIG. 17 is a diagram illustrating a partial cross-section view of an apparatus for crimping a sensor apparatus housing according to embodiments of the present disclosure.

The exemplary method of FIG. 14 differs from the exemplary method of FIG. 13 in that crimping (1350) the crimping portion of the housing on the flange such that a rim of the crimping portion is bent onto a top surface of the flange further comprises bending (1410), by a first crimp dye, the rim of the crimping portion inward toward a rotational axis of the housing such that the rim overhangs the top surface of the flange. Bending (1410), by a first crimp dye, the rim of the crimping portion inward toward a rotational axis of the housing such that the rim overhangs the top surface of the flange may be carried out by lowering a dye press comprising the primary crimping dye (210) onto the crimping portion (131) of the housing (130) such that the rim (137) of the crimping portion (131) is turned inward toward the rotational axis of the housing, and downward toward the top surface (113) of the connector flange (112) (see FIG. 15). The first crimping action is complete, for example, when the primary dye (210) contacts the base support dye (230) (see FIG. 16). During the bending (1410) of the rim (137) of the crimping portion, a radial constraint portion (313) of the first crimping dye (210) provides support to the remaining crimping portion so as to prevent outward bulging of the crimping portion (131) during crimping. Bending (1410), by a first crimp dye, the rim of the crimping portion inward toward a rotational axis of the housing such that the rim overhangs the top surface of the flange may include generating dimples in the rim of the crimping portion by crimping dye protrusions on The exemplary method of FIG. 14 further differs from the exemplary method of FIG. 13 in that crimping (1350) the crimping portion of the housing on the flange such that a rim of the crimping portion is bent onto a top surface of the flange further comprises bending (1420), by a second crimp dye, the edge of the rim toward the top surface of the flange such that the interior wall of the rim contacts the top surface of the flange. Bending (1420), by a second crimp dye, the edge of the rim toward the top surface of the flange such that the interior wall of the rim contacts the top surface of the flange may be carried out by lowering a dye press comprising the secondary crimp dye (220) onto the rim (137) of the crimping portion (131) of the housing (130) that has been already bent inward by the primary crimp dye (see FIG. 17). The secondary crimping dye (220) includes a flat face that presses down on the rim (137) of the crimping portion (131) of the housing (130) the inner wall of the rim (137) is substantially flattened against the top surface (113) of the connector flange (112). The second crimping action of the secondary crimp dye (220) may substantially reduce the air volume between the rim (137) and the top surface (113) of the connector flange (112). A bead of sealant may be applied to the joint between the rim (137) and the top surface (113) of the connector flange (112) to further seal the sensor apparatus. After the second crimping action of the secondary crimp dye (220) is complete, the dye press comprising the primary crimp dye (210) and the secondary crimp dye (220) may be raised and the base support dye (230) may be removed to retrieve the sensor apparatus.

Note that techniques herein are well suited for use in any type of sensor application such as pressure sensor assemblies and temperature sensor assemblies as discussed herein. However, it should be noted that embodiments herein are not limited to use in such applications and that the techniques discussed herein are well suited for other applications as well.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A sensor apparatus, comprising:
    a sensor port;
    a thin-walled tubular housing coupled to the sensor port and comprising a crimping portion, a base portion, and a step feature that is formed in the housing, the step feature partitioning the crimping portion from the base portion;
    sensor components disposed within the interior of the base portion of the housing; and
    an electrical connector coupled to the housing and comprising leads electrically coupled to the sensor components and a connector flange, wherein a rim of the crimping portion of the housing is crimped onto the connector flange such that the electrical connector is retained in the housing;
    wherein the step feature includes a plurality of protrusions formed on an interior surface of the housing corresponding to a plurality of recesses in the connector flange of the electrical connector.

2. The sensor apparatus of claim 1, wherein the sensor components include:
    a sense element;
    electronic circuitry electrically coupled to the sense element; and
    one or more electrical conductors electrically coupled to the electronic circuitry, wherein leads of the connector are electrically coupled to the one or more electrical conductors.

3. The sensor of claim 2, wherein the one or more electrical conductors include at least one of a flexible printed circuit board, a plurality of electrical wires having connectors at each end, and a plurality of soldered wires.

4. The sensor apparatus of claim 1, wherein the step feature of the housing includes an annular ledge, and wherein the annular ledge supports the flange and provides bending and torsional stiffness to the housing during crimping of the crimping portion.

5. The sensor apparatus of claim 1, wherein the housing is formed by a stamping process.

6. The sensor apparatus of claim 5, wherein the thickness of the housing wall in the base portion and the thickness of the housing wall in the crimping portion of the housing varies in accordance with a direction of the stamping process,
    wherein, when the direction of the stamping process is a first direction, the thickness of the housing wall in the base portion exceeds the thickness of the housing wall in the crimping portion, and
    wherein, when the direction of the stamping process is a second direction, the thickness of the housing wall in the crimping portion exceeds the thickness of the housing wall in the base portion.

7. The sensor apparatus of claim 1, wherein the sensor is a pressure sensor, the sensor components includes at least a sense element to measure pressure of a fluid and pressure sensor circuitry coupled to the sense element to convert the pressure sensed by the sense element into an electronic signal, and the port includes a conduit for introducing the fluid to the sense element.

8. The sensor apparatus of claim 1, wherein the sensor is a temperature sensor, the sensor components includes at least a sense element to measure temperature of a fluid and temperature sensor circuitry coupled to the sense element to convert the temperature sensed by the sense element into an electronic signal, and the port includes a conduit for introducing the fluid to the sense element.

9. A method of assembling a sensor apparatus having a crimped housing comprising:
    providing a thin-walled tubular housing on a sensor port, the housing comprising a crimping portion, a base portion, and a step feature that is formed in the housing, the step feature partitioning the crimping portion from the base portion, wherein sensor components are disposed inside the housing;
    inserting at least a portion of an electrical connector to the housing, including disposing an annular flange of the electrical connector inside the crimping portion of the housing such that a bottom face of the flange contacts the step feature;
    placing a support dye around the base portion of the housing; and
    crimping the crimping portion of the housing on the flange such that a rim of the crimping portion is bent onto a top surface of the flange including:
    bending, by a first crimp dye, the rim of the crimping portion inward toward a rotational axis of the housing such that the rim overhangs the top surface of the flange; and
    bending, by one or more second crimp dyes, the edge of the rim toward the top surface of the flange such that the interior wall of the rim contacts the top surface of the flange.

10. The method of claim 9, wherein the first crimp dye comprises a curved lip and a radial constraint portion, and wherein the crimping portion is deformed in accordance with a curvature of the lip as the first crimp dye approaches the support dye during crimping, and wherein the radial constraint portion inhibits outward bulging of the crimping portion of the housing.

11. The method of claim 9, wherein the first crimp dye includes a plurality of protrusions that, during crimping, create dimples in the rim of the crimping portion that engage corresponding dimples in the flange for inhibiting rotation of the connector in the housing.

12. The method of claim 9, wherein the one or more second crimp dyes comprises a flat tip for pushing the rim of the crimping portion against the top surface of the flange subsequent to the bending by the first crimp dye.

13. The method of claim 9, wherein the step feature of the housing includes an annular ledge, and wherein the annular ledge supports the flange during crimping of the crimping portion.

14. The method of claim 9, wherein the step feature includes a plurality of protrusions formed on the interior surface of the housing corresponding to a plurality of recesses in the flange of the electrical connector.

15. The method of claim 9, wherein the housing is formed by a stamping process.

16. The method of claim 15, wherein the thickness of the housing wall in the base portion of the housing and the housing wall in the crimping portion of the housing varies in accordance with a direction of the stamping process, wherein, when the direction of the stamping process is a first direction, the thickness of the housing wall in the base portion exceeds the thickness of the housing wall in the crimping portion, and wherein, when the direction of the stamping process is a second direction, the thickness of the housing wall in the crimping portion exceeds the thickness of the housing wall in the base portion.

17. The method of claim 9, wherein the sensor is a pressure sensor, the sensor components includes at least a sense element to measure pressure of a fluid and pressure sensor circuitry coupled to the sense element to convert the pressure sensed by the sense element into an electronic signal, and the port includes a conduit for introducing the fluid to the sense element.

18. The method of claim 9, wherein the sensor is a temperature sensor, the sensor components includes at least a sense element to measure temperature of a fluid and temperature sensor circuitry coupled to the sense element to convert the temperature sensed by the sense element into an electronic signal, and the port includes a conduit for introducing the fluid to the sense element.

\* \* \* \* \*